United States Patent [19]

Mock et al.

[11] Patent Number: 5,636,306
[45] Date of Patent: Jun. 3, 1997

[54] UNIVERSAL GROUNDING CLIP

[75] Inventors: George E. Mock, Duluth; Denis E. Burek, Cumming, both of Ga.

[73] Assignee: Lucent Technologies Inc., Murray Hill, N.J.

[21] Appl. No.: 428,289

[22] Filed: Apr. 25, 1995

[51] Int. Cl.$^6$ .................................................. G02B 6/44
[52] U.S. Cl. .......................... 385/101; 385/100; 439/579
[58] Field of Search .............................. 385/100–105, 385/134–136; 439/188, 579

[56] References Cited

U.S. PATENT DOCUMENTS

| | | | |
|---|---|---|---|
| 3,781,757 | 12/1973 | Barnes | 439/579 |
| 4,844,575 | 7/1989 | Kinard et al. | 350/96.23 |
| 4,909,592 | 3/1990 | Arroyo et al. | 350/96.23 |
| 5,125,063 | 6/1992 | Panuska et al. | 385/113 |
| 5,440,666 | 8/1995 | Burek et al. | 385/135 |

*Primary Examiner*—Phan T. H. Palmer

[57] ABSTRACT

A universal grounding clip for use with a cable having a frame assembly with a first end and a second end, a base member form at the first end of the frame, and a pair of leg members extending from the first end of the frame toward the second end of the frame where a crossmember is positioned and extends between each of the leg members, thus defining a central opening through the frame adapted to receive a cable. A pair of opposed grip members are supported in the opening, and are adapted to be moved toward each other for affixing a cable to the frame. Each grip member has a pair of bifurcated legs having, on either side of the bifurcation, an arcuate toothed leg portion adapted to grip the cable. At least one ground wire opening is defined in the base member and extends therethrough adapted to simultaneously fasten a ground wire to the frame as the grip members affix the cable to the frame.

10 Claims, 3 Drawing Sheets

UNIVERSAL GROUNDING CLIP

FIELD OF THE INVENTION

This invention relates in general to electrical grounding clips. More particularly, this invention relates to a universal electrical grounding clip for use in grounding an optical fiber or other type of cable having metallic components as members.

BACKGROUND OF THE INVENTION

Optical fibers are playing an increasingly important role in communications signal transmission, and are increasingly replacing traditional signal transmission means, such as coaxial cable and twisted pairs. Optical fibers have the advantages of a large signal bandwidth, coupled with relatively small size and light weight. These advantages, however, carry with them certain problems inherent in the nature of the optical fiber cable itself. The optical fibers used in the cables are primarily made of glass or other low ductility materials and are, thus, mechanically fragile, being characterized by a low strain fracture point, especially in tensile loading. As a result, therefore, cable structures have been developed for mechanically protecting the optical fibers in various environments.

One of the structures developed to protect optical fibers has been to include strength members in the cable. The strength members are not involved in signal transmission, but are instead used to limit the strain on the optical fibers and to carry the load of the optical fiber cable where, for example, the cable is suspended above ground.

In U.S. Pat. No. 4,844,575 of Kinard et al., there is shown a lightweight optical fiber cable which includes a sheath system having two strength members diametrically opposed to one another on each side of a central core formed by a tubular plastic jacket in which the optical fibers are carded. The strength members extend longitudinally along the cable parallel to the axis thereof. The strength members are enclosed in a plastic jacket, and have a predetermined relative tensile and compressive stiffness so that they are capable of withstanding expected compressive and tensile loadings, and are sufficiently coupled with the jacket to provide a composite cable arrangement. The strength members of Kinard et at. are made of a metallic material, such as steel, for example.

In U.S. Pat. No. 5,125,063 of Panuska et at., a lightweight optical fiber cable is shown having at least one bundle of optical fibers disposed within a tubular member forming a cable central core enclosed by a sheath system which includes two elongated longitudinal strength members extending along the length of fiber optical cable. The sheath system also includes a metallic armor layer which encloses a waterblocking tape for providing increased tensile and compressive stiffness, as well as protecting the optical fiber cable from damage.

An inherent problem in the use of metallic strength members, however, arises when exposed optical fiber cable is struck by lightning whereupon the electrical charge may travel along one or both of the strength members which form a part of the cable. Moreover, a lightning strike may also penetrate the cable jacket and strike the metallic sheath of the cable, transmitting electricity along the length of the cable until the electrical current is either dissipated by encountering a ground, or is otherwise shorted out. Also, due to ambient conditions, it is possible that the optical fiber cable may hold a static electrical charge in either the strength elements or the metallic sheath thereof. Grounding of the cable is thus necessary in order to prevent damage to people and property from stray and unexpected electrical current passing through the mechanical components of the optical fiber cable, and to dissipate any static charges.

As a consequence, optical fiber cable is routinely grounded when it is spliced, and where it enters into commercial and residential structures. This is accomplished through the use of conventional bonding and grounding hardware known to those skilled in the art.

In the known bonding and grounding hardware a sealing clamp is passed over the outside of the cable and the plastic cable jacket is then cut and opened to leave a portion of the metallic sheath exposed, as well as the metallic strength members. Thereafter, the metallic strength members are each bent at an angle of approximately 90° from the longitudinal axis of the cable, and the base section of the wire retainer is placed over the cable. The metallic strength members fit within notches formed in the base of the wire retainer, and the sealing clamp is then slid over the base of the wire retainer and tightened to secure the wire retainer to the cable. The excess length of the metallic members protruding beyond the base of the wire retainer are then cut. A bond shoe is then slid between the corrugated metal sheath and the tubular member of the optical fiber cable until the bond shoe stud lies against the end of the metallic sheath, the bond shoe stud being aligned with the wire retainer. Thereafter, a bond plate is placed over the bond shoe, the bond shoe stud being threaded and extending upward therefrom and passed through the bond plate. A second opening in the bond plate is aligned with a corresponding opening formed in the wire retainer so that a threaded fastener can be passed therethrough and into a bonding block which acts to secure the wire retainer, the bond shoe, and the bond plate to the optical fiber cable. Thereafter, a ground wire, or ground wires, provided by a cable installer or splicer, is placed into the bonding block, and secured to the bonding block by set screws to ground the cable.

Although this bonding and grounding hardware known in the art can satisfactorily perform the task of grounding the optical fiber cable, from the foregoing it can be seen that it has a multiplicity of parts and requires a number of steps to install, thus necessitating the expenditure of large amounts of time to assemble the hardware in order to ground the cable properly. Moreover, should the cable installer or splicer misplace or be missing any of the several component parts of this hardware, the cable cannot be successfully grounded, and the dangerous conditions sought to be avoided remain.

What is needed and what seemingly is not available in the art is a universal grounding clip which does not require assembly, or requires only minimal assembly, at the site of its intended use, and which can be quickly and readily fastened to an optical fiber cable in order to ground the metallic strength elements and/or metallic sheath thereof. Desirably, such a grounding clip would be relatively low in cost and have few components or parts.

SUMMARY OF THE INVENTION

The present invention is an improved universal grounding clip which overcomes some of the design deficiencies of the grounding clip known in the art. The invention is a generally pre-assembled grounding clip having a frame, an opening defined within the frame and passing therethrough adapted to receive an optical fiber cable, a pair of opposed grip members supported on the frame within and on opposite sides of the opening, where the grip members are adapted to be moved into physical and electrical engagement with the cable in the frame. Also, as the grip members are moved into engagement with the strength elements and/or metallic sheath of the cable, a separately provided ground wire is simultaneously fastened to the frame, and the cable is thus grounded.

In accordance with one aspect of the invention, the frame has a first end and a second end, a base member formed at the first end, a pair of spaced apart and generally parallel leg members extending from the base member toward the second end of the frame, and a cross member at the second end of the frame extending between both of the leg members to form a one piece framework. First and second grip members of the grounding clip each comprise a member that has a substantially U-shaped cross section with bifurcated legs. Each leg has, on either side of the bifurcation, an arcuate toothed portion adapted to grip the cable. The two legs on one side of the bifurcation are spaced apart a distance greater than the two legs on the other side of the bifurcation so that the legs of the second grip member slidably pass inside the two more widely spaced legs of the first member and outside the less widely spaced legs thereof.

An elongated screw pad is movably supported between the legs of the frame, and is adapted to bear against the first grip member. A clamping screw passes through a threaded opening in the base member of the frame, and is adapted to bear against the screw pad for the purpose of moving it toward the first grip member and to drive it toward the second grip member to clamp or grip the cable passed through the opening in the frame with the arcuate toothed portions of the grip members. An elongated slot in the base member of the frame has an elongated movable nut plate, through which the screw is threaded, loosely pinned therein. The plate has openings adapted to receive ground wires passed through corresponding openings in the frame so that as the clamping screw drives the screw pad and the grip members into engagement with the cable, the nut plate reacts in the direction opposite to the movement of the first grip member thereby pinching the ground wire between the openings defined in the base member and the nut plate.

Thus, the present invention provides a simple and efficient device and method for quickly and efficiently grounding a cable without the need to assemble a grounding clip assembly from a plurality of loose parts at the job site.

The features and advantages of the present invention will be more readily apparent from the following detailed description read in conjunction with the accompanying drawings.

DESCRIPTION OF THE DRAWINGS

FIG. 3b is an end elevational view of the grip member of FIG. 3a; and,

DETAILED DESCRIPTION

Figure 1:
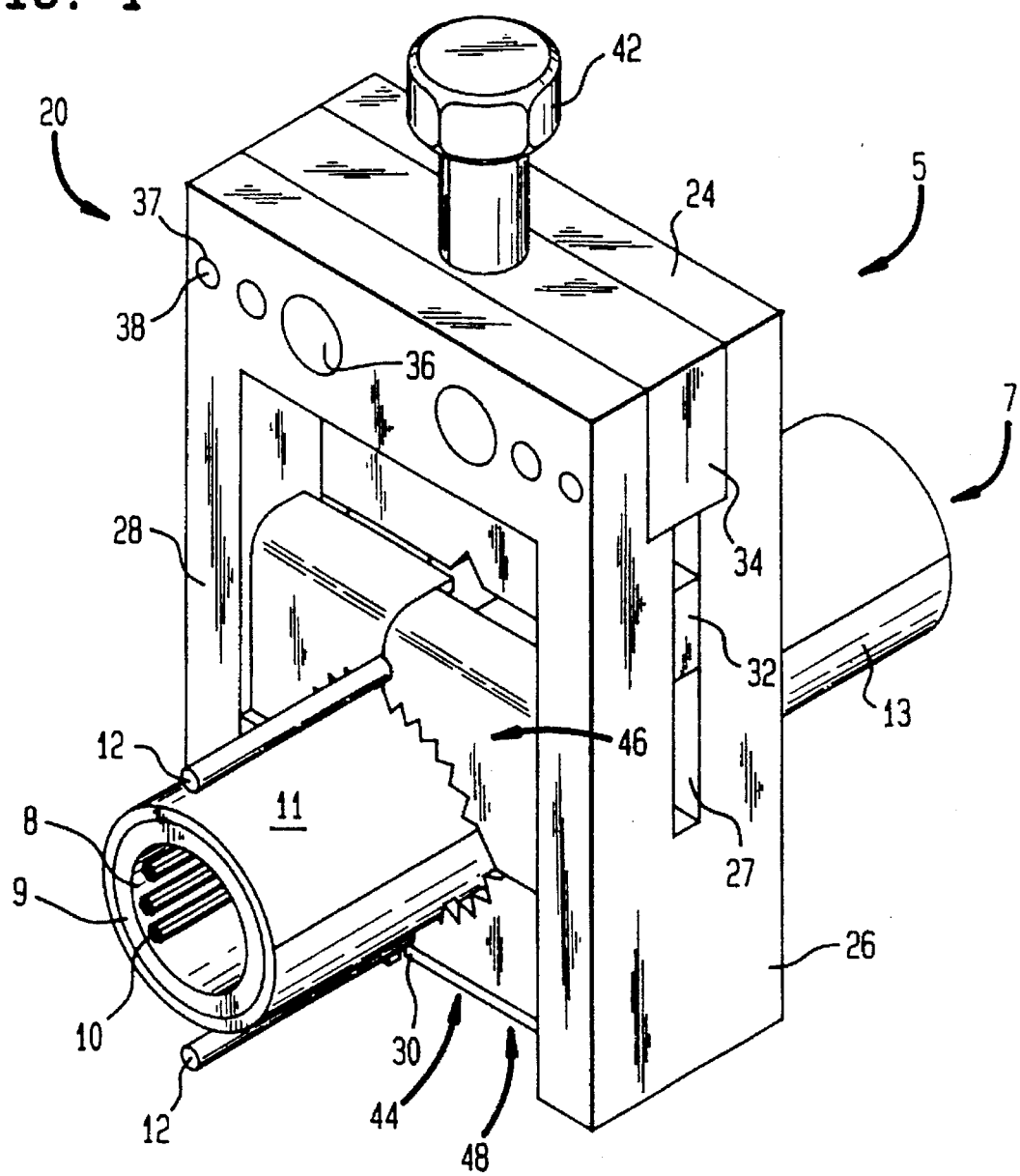
FIG. 1 is a perspective view of the universal grounding clip shown with an optical fiber cable.

Referring now in detail to the drawings, in which like reference numerals indicate like parts throughout the several views, numeral 5 of FIG. 1 illustrates a preferred embodiment of the universal grounding clip. Universal grounding clip 5 as shown in FIG. 1, is used to electrically ground an optical fiber cable 7. Optical fiber cable 7 comprises a central core 8 formed by a tubular member 9 which encloses a plurality of loose optical fiber bundles 10. A sheath 11 encloses tubular member 9 and extends along the entire length of cable 7. Sheath 11 may include a suitable water-blocking tape having an overlapped seam along its length, such an arrangement being disclosed in U.S. Pat. No. 4,909,592 of Arroyo and Gagen issued on Mar. 20, 1990. It is anticipated, however, that sheath 11 is a metallic member which is corrugated and has an overlapping seam extending along the length of cable 7. Such a sheath arrangement is disclosed in U.S. Pat. No. 4,844,575 to Kinard et at., issued on Jul. 4, 1989. Sheath 11 may be made of any metallic material, including steel, stainless steel, bronze, copper steel bimetal, aluminum, or other metallic substances. Additionally, sheath 11 may have each of its sides coated with a material, such as an acrylic acid copolymer, to protect it against corrosion and to prevent the sheath from becoming bonded to the tubular member of the cable.

The optical fiber cable also includes a pair of strength elements 12 which are diametrically opposed to one another along the length of the cable. Strength elements 12 may include either metallic wires or glass, or ceramic rods, which have both tensile and compressive stiffness necessary to provide support for the cable. The strength elements are usually made of metallic wires, thus the present need for their grounding.

The last element of optical fiber cable 7 is a cable jacket 13 which encloses the components of the optical fiber cable. Cable jacket 13 is generally made of a suitable insulating material.

Figure 2:
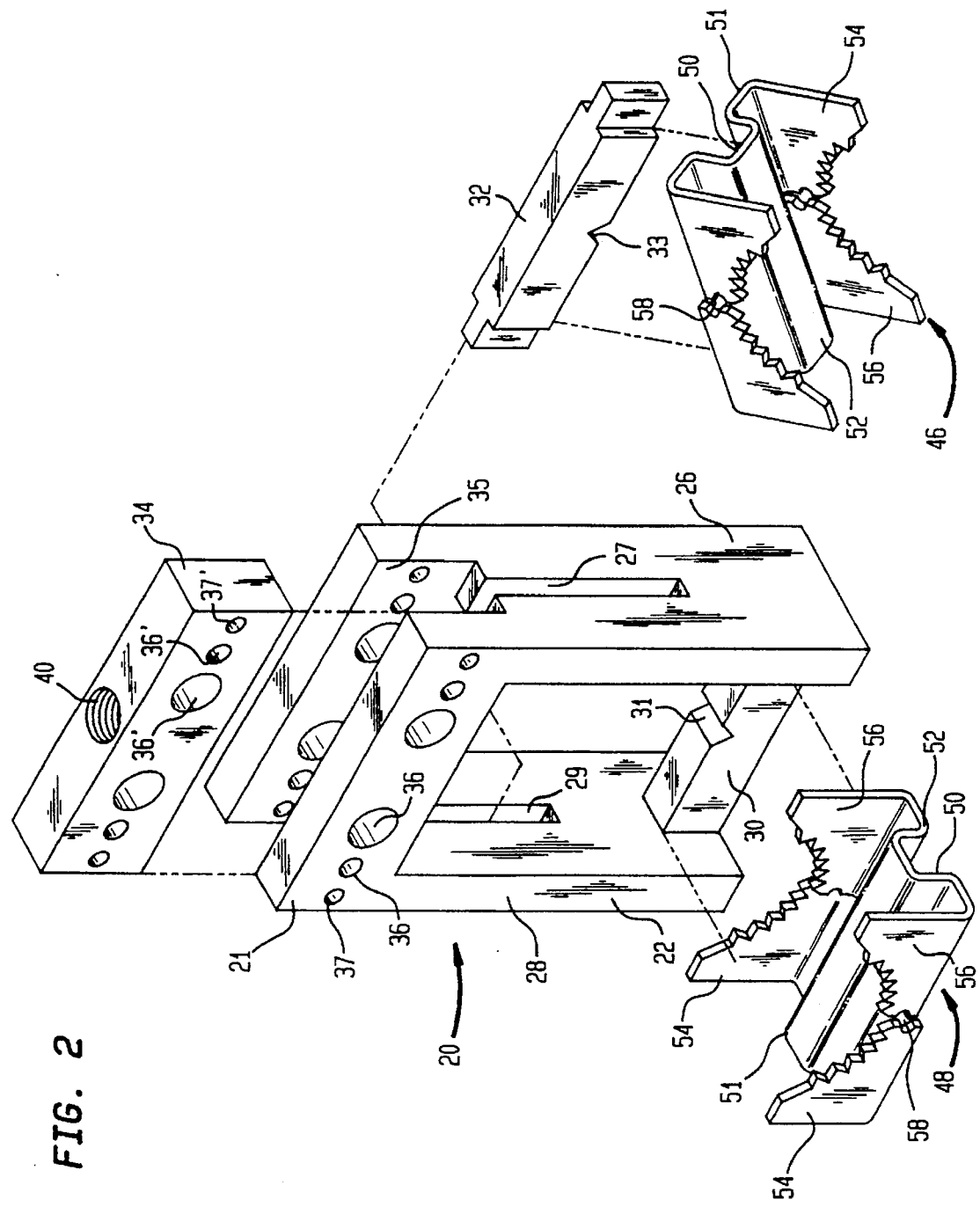
FIG. 2 is an exploded perspective view of the universal grounding clip of FIG. 1.

As shown in FIGS. 1 and 2, the universal grounding clip 5 of the invention has a frame 20 having a first end 21 and an opposed second end 22. Base member 24 is formed at first end 21, and a first leg member 26 and a second leg member 28 extend from the base member toward the second end of the frame, where a cross member 30 is positioned, cross member 30 being connected, and extending between, each of leg members 26 and 28, respectively.

Both the first and second leg members have a slotted opening 27 and 29, respectively, which extends along at least a portion of the length of the leg member from the base member toward the cross member. Slotted openings 27 and 29 are adapted to receive a screw plate 32, the ends of which are adapted to travel within slotted openings 27 and 29 toward and away from cross member 30. Cross member 30 has a centrally located notch 31 formed therein for receiving one of strength elements 12 of the cable. Screw plate 32 also has a centrally located notch 33 for receving the second of strength elements 12 when the optical fiber cable is passed through frame 20.

The base member of the frame includes a nut plate 34 which is positioned within a slot 35 formed within and passing through base member 24. Nut plate 34 is sized and shaped to fit slidably within slot 35 so that it does not protrude beyond the edges of base member 24. The base member includes at least one ground wire opening 36 in registry with opening 36' when nut plate 34 rests in the slot 35. Each ground wire opening 36 defined in base member 24 extends through both portions of the base member on each side of slot 35, so that when a ground wire is passed by a technician through an opening 36 and a corresponding opening 36', the wire will extend through frame 20. In similar fashion, a pair of pin openings 37 are formed in base member 24, with a pair of corresponding pin openings 37' formed in the nut plate. The pin openings formed in the nut plate are oversized, that is, they are larger in diameter than the pin openings provided in frame 20, and thus larger than the diameter of pins 38 (FIG. 1) passed through each of the pin openings so that nut plate 34 is both pinned within slot 35, yet is upwardly displaceable due to the travel of pins 38 in oversized openings 37'.

Nut plate 34 includes a threaded opening 40 extending therethrough so that a clamping screw 42 (FIG. 1), or other threaded fastener (not illustrated) is passed therethrough and extends downward into the opening defined between the first and second leg members of frame 20.

Figure 3A:
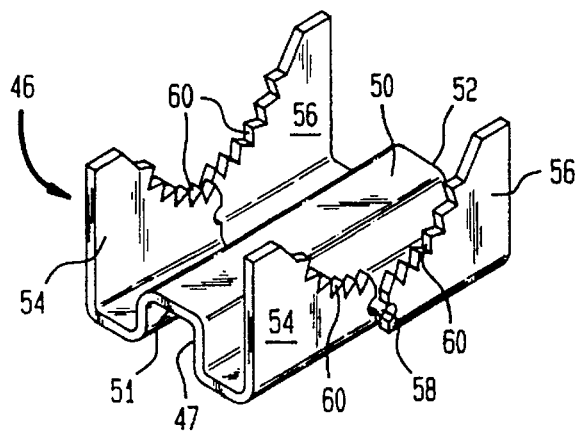
FIG. 3a is a perspective view of a grip member of the universal grounding clip illustrated in FIG. 1.
Figure 3B:
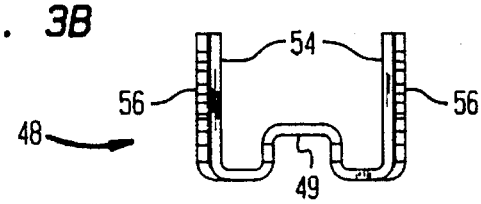

As shown in FIGS. 1 and 2, the universal grounding clip has a grip member assembly 44 including a first grip member 46 and a second substantially identical grip member 48. Referring now to FIGS. 3a and 3b, grip members 46 and 48, respectively, are illustrated in greater detail. Each grip member is substantially U-shaped and has a base section 50 which extends along its length, the base section having a first end 51 and a second end 52. Each leg of the U-shaped base section is bifurcated at slots 58 to form a first pair of spaced legs 54 and a second pair of spaced legs 56, with the spacing between legs 56, 56 being greater than the spacing between legs 54, 54, as best seen in FIG. 3b. Each of the four legs 54, 54 and 56, 56 has an arcuate toothed section 60 for gripping the cable, as best seen in FIG. 1, each making electrical contact with the armored sheath.

As shown in FIGS. 3a and 3b, first grip member 46 has a recess 47 therein for receiving screw plate 32 and second grip member 48 has a recess 49 therein for receiving crossmember 30. Grip members 46 and 48 are interchangeable with one another within frame 20. As shown in both FIGS. 2 and 3, each grip member has a notched slot or opening 58 formed therein. Notched slot or opening 58 is adapted to receive one of the strength members 12, and notched opening 58 is in registry with notches 31 and 33 formed in crossmember 30 and screw plate 32, respectively, when the grip members are positioned thereon.

Each of the teeth in each arcuate section 60 is sharp enough to penetrate into cable armor 11 to ensure grounding of the cable. Moreover, notched slots 58 formed between each pair of legs on the grip members is sized and shaped so that a strength member 12 is frictionally engaged by the grip member as it is passed through the notched opening, again for the purposes of ensuring that the optical fiber cable is properly ground.

Figure 4:
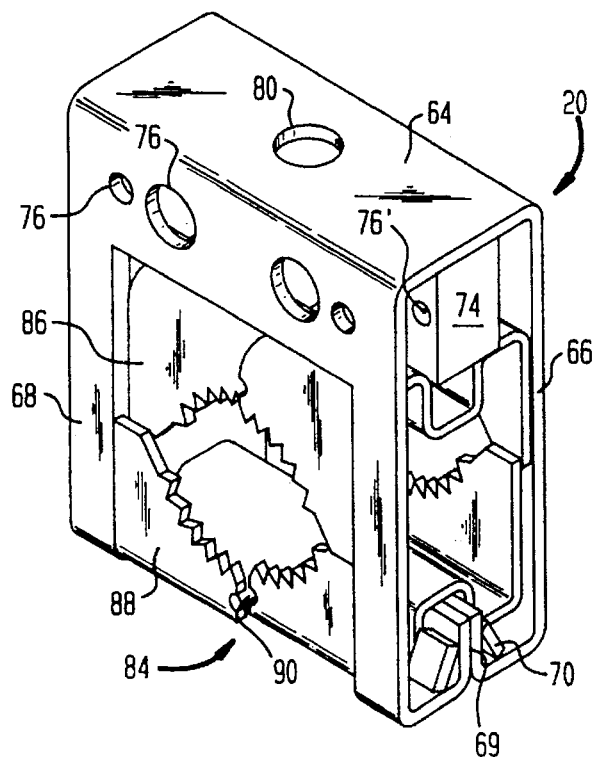
FIG. 4 illustrates an alternate preferred embodiment of the universal grounding clip.

An alternative embodiment of universal grounding clip 5 is illustrated in FIG. 4. The grounding clip of FIG. 4 differs from the grounding clip of FIGS. 1 and 2 primarily in that it is intended to be passed over an optical fiber cable with the ends of the frame being brought toward each other and fastened together, while the grip members are inserted into the frame during assembly. The grounding clip of FIG. 4 has a frame 20, frame 20 having a base member 64 and two bifurcated legs. A first pair of legs 66, 66 and a second pair of legs 68, 68 extend away from the base member, each leg 66 and 68 having an upturned end 69 adapted to be positioned adjacent the upturned end of the other leg 66 and 68, respectively. A crossmember fastener 70 is placed over the upturned ends 69 for fastening legs 66 and 68 of each pair of legs together, thus forming frame 20. As with the grounding clip of FIGS. 1 and 2, the grounding clip of FIG. 4 defines a central opening passing therethrough adapted to receive an optical fiber cable.

Grounding clip 5 of FIG. 4 has a nut plate 74 positioned underneath base member 64 facing toward the inside of frame 20, the nut plate being pinned to the underside of the base member. At least one ground wire opening 76 is formed in base member 64, with a corresponding ground wire opening 76' formed in the nut plate so that a ground wire can be extended all the way through base member 64 and nut plate 74. Additionally, a threaded opening 80 is formed in base member 64 and extends through the nut plate toward the opening defined by frame 20. The grounding clip also includes a grip member assembly 84, having a first grip member 86 and a second grip member 88. In fashion similar to the grounding clip of FIGS. 1 and 2, first grip member 86 is movably supported on frame 20, and second grip member 88 is supported on crossmember fastener 70. Each of grip members 86 and 88 is formed in fashion similar to grip members 46 and 48, and is thus not described in greater detail herein. Crossmember fastener 70 has a notch (not illustrated) defined therein, and a notched opening 90 is defined within each of grip members 86 and 88 for passing one of strength members 12 therethrough.

As shown in FIGS. 1 and 4, the first and second grip members of each grip member assembly are positioned within frame 20 so that the first pair of legs 54, 54 of the first grip member 46 are opposite the second pair of legs 56, 56 of the second grip member, and the second pair of legs 56, 56 of the first grip member are opposite the first pair of legs 54, 54 of the second grip member, so that as the first grip member is moved toward the second grip member, for example, when it is desired to fasten the grounding clip to a cable, legs 54, 54 of the first grip member slidably pass inside the two more widely spaced legs 56, 56 of the second grip member, while legs 56, 56 pass outside the less widely spaced legs 54, 54 of the second grip member.

OPERATION

The grounding clip of FIGS. 1 and 2 operates in the following manner. An optical fiber cable is passed through the opening defined within the same between first grip member 46 and second grip member 48. In order to position the optical fiber cable in the grounding clip, cable jacket 13 is stripped so that strength elements 12 are exposed. Each of the strength elements 12 is then passed through the notched slot or opening 58 formed in the first and second grip members, respectively, and the corresponding notches 31 and 33 formed in crossmember 30 and screw plate 32. Once the strength members have been passed through notched openings 58, first grip member 46 is moved toward second grip member 48 by turning clamping screw 42 in threaded opening 40, clamping screw 42 extending through nut plate 34 and bearing on screw plate 32. Screw plate 32 then pushes first grip member 46 toward second grip member 48, whereupon arcuate toothed section 60 of each leg 54 and 56 engages metallic sheath 11.

Each of arcuate toothed sections 60 is adapted to extend into metallic sheath 11 to ground the metallic sheath. However, toothed sections 60 of first grip member 46 and second grip member 48 are manufactured such so that they do not extend through tubular member 9 and into central core 8. In the event that the optical fiber cable is not provided with a pair of strength members 12, as shown in FIG. 1, it is intended that each of arcuate toothed sections 60 of the grip members will penetrate through metallic sheath 11.

Due to the construction of grounding clip 5, as described above, first grip member 46 and second member 48 will nest within each other, legs 54, 54 of first grip member 46 slidably passing between the two more widely spaced legs 56, 56 of second grip member 48, and legs 54, 54 of second grip member 48 slidably passing between legs 56, 56 of first grip member 46, as illustrated in FIGS. 1 and 4.

At or before the time that optical fiber cable 7 has been passed through the opening defined in frame 20, a ground wire (not illustrated) will be extended by a technician through one of ground wire openings 36 and its corresponding ground wire opening 36' so that when clamping screw 42 is turned to drive screw plate 32, and thus first grip member 46, toward second grip member 48, and as the grip members engage the cable, nut plate 34 reacts upward in the direction opposite to the movement of first grip member 46 so that ground wire opening 36' in nut plate 34 is no longer in registry with ground wire opening 36, thus pinching or fastening the ground wire to base member 24 of the frame.

The upward movement of nut plate 34 is controlled by the size of oversized pin openings 37' formed in the nut plate, which act to limit the extent of travel through which the nut plate may be moved. It is anticipated that oversized pin openings 37' will be sized so that nut plate 34 is upwardly displaceable to the extent that the ground wire will be frictionally engaged and thus fastened within the base member so that it cannot be readily removed from the base member.

Thus, a unique feature of this grounding clip is that as screw 42 is turned, the grounding dip simultaneously grounds optical fiber cable 7 while fastening a ground wire (not illustrated) to the grounding clip, thus greatly reducing the number of steps needed in order to ground the optical fiber cable, in contrast to the bonding and grounding hardware known in the art. It is anticipated that grounding clip 5, as shown in FIGS. 1 and 2, will be preassembled so that a cable splicer or technician need only strip a portion of the insulation off of the cable, pass the cable and strength members through the grip members, place the ground wire through the openings defined in the base member and nut plate, and turn the damping screw to move the grip members into engagement with the optical fiber cable while simultaneously fastening the ground wire to the grounding clip.

The grounding clip of FIG. 4 performs in much the same manner, but is placed on the cable differently. The grounding dip of FIG. 4 is placed over a stripped cable with strength elements 12 of metallic sheath 11 exposed. The grip member assembly 84 is positioned on sheath 11, strength elements 12 are passed through the notched slot or opening 90 formed within each of the grip members. With the grip members properly fitting between each other, frame 20 is then placed over the optical fiber cable, and the upturned ends 69 of each of the pairs of legs 68, 68 are brought toward each other and fastened by crossmember fastener 70. Thereafter, a clamping screw (not illustrated) is passed through threaded opening 80, and moves first grip member 86 downward toward second grip member 88, nut plate 74 reacting in the direction opposite the movement of the grip members as they engage the optical fiber cable, for fastening a ground wire (not illustrated) passed through ground wire openings 76 and corresponding ground wire openings 76' to the frame.

As illustrated herein, grounding dip 5, to include all of the component members with the possible exception of clamping screw 42, will be formed of a metallic or ductile substance adapted to conduct electricity, to include beryllium copper, brass, half hardened brass, steel, aluminum, or any other ductile and conductive material. Clamping screw 42 may be constructed of the same material, or can be a standard machine screw.

The principles and features of the present invention have been disclosed in the several preferred embodiments discussed herein. Numerous changes, alterations, or adaptations may occur to workers in the art without departure from the spirit and scope of the invention.

We claim:

1. A universal grounding clip for use with a cable comprising:

a frame, said frame including a first end and a second end, a base member formed at the first end of the frame, a pair of spaced apart and generally parallel leg members extending from the base member toward the second end of frame, and a cross-member positioned at the second end of the frame, said cross member being connected to and extending between said leg members, an elongated slot defined in and extending through the base member of the frame, an elongated and upwardly displaceable nut plate pinned at each of its ends within said slot with said nut plate being moveable within said slot, at least one bore defined in said nut plate transverse to the length thereof and extending therethrough, said bore being sized and shaped to receive a ground wire and being substantially in registry with a pair of bores defined one each in the base member in each side of said slot adjacent said nut plate;

an opening defined within the frame and passing therethrough, said opening being adapted to receive the cable therein;

grip means for gripping the cable, said grip means being supported on the frame within said opening and including a first grip member and a second grip member, said first grip member being adapted to move toward and away from the second grip member;

means for moving said grip means into engagement with the cable; and means for simultaneously fastening a ground wire to the frame, said means for fastening comprising clamping screw means for moving the first grip member toward the second grip member, wherein the nut plate is adapted to react in the direction opposite the direction of movement of the first grip member as the grip members engage the cable to pinch the ground wire in said bores.

2. A universal grounding clip for use with a cable and a separately provided ground wire, said grounding clip comprising:

a frame member having an opening therein for receiving a cable, said frame having a fixed portion and a movable portion;

movable grip means within said opening;

means affixed to said frame for moving said grip means into engagement with the cable within said opening said means for moving said grip means being in engagement with said movable portion; and wherein said fixed portion has at least one bore extending therethrough and said movable portion has at least a second bore extending therethrough substantially in registry with said at least one bore, said at least one bore and said second bore each being sized and shaped for passage of the ground wire therethrough, and wherein said means for moving said grip means includes means for moving said at least one bore and said second bore out of registry when said grip means engages the cable.

3. A universal grounding clip for use with a cable comprising:

a frame, said frame having a first end and a second end, a base member formed at the first end of the frame, a pair of spaced apart and generally parallel leg members extending from the base member toward the second end of frame, and a cross member positioned at the second end of the frame connected to and extending between said leg members, said frame forming a central opening between the base member and the cross member and extending through the frame;

a first grip member supported within said opening and a second grip member supported opposite said first grip member within said opening, each of said grip members having a pair of bifurcated legs, each leg portion having on either side of the bifurcation an arcuate toothed portion adapted to grip the cable;

clamping screw means for moving said first grip member toward the second grip member to affix the cable to the frame; and means for simultaneously fastening a ground wire to the frame as the cable is affixed to the frame.

4. The grounding clip of claim 3, wherein the two leg portions on one side of the bifurcation are spaced apart a distance greater than the two let portions on the other side of the bifurcation.

5. The grounding clip of claim 4, wherein the leg portions of the second grip member are adapted to slidably pass inside the two more widely spaced leg portions of the first grip member, and outside the less widely spaced leg portions thereof.

6. A universal grounding clip for use with a cable comprising:

a frame, said frame having a first end and a second end, a base member formed at the first end of the frame, a pair of spaced apart and generally parallel leg members extending from the base member toward the second end of frame, and a cross-member positioned at the second end of the frame, said cross member being connected to and extending between said leg members;

an opening defined within the frame and passing therethrough, said opening being adapted to receive the cable therein;

grip means for gripping the cable, said grip means being supported on the frame within said opening and having a first grip member and a second grip member, said first grip member being adapted to move toward and away from the second grip member;

said first and said second grip members each comprising a base section and a pair of bifurcated legs, each said bifurcated leg having, on either side of the bifurcation, an arcuate toothed leg portion adapted to grip the cable, wherein the two leg portions on one side of the bifurcation are spaced apart a distance greater than the two leg portions on the other side of the bifurcation;

means for moving said grip means into engagement with the cable; and means for simultaneously fastening a ground wire to the frame.

7. The grounding clip of claim 6, further comprising:

an elongated slot defined in each leg member of the frame, each slot being parallel to and opposite the other;

an elongated screw pad, the ends of which are adapted to be separately guided within one each of said slots, wherein said screw pad is adapted to bear on said first grip member;

wherein said means for moving said grip means into engagement with the cable comprises clamping screw means mounted in said base member and extending therethrough, said clamping screw means being adapted to bear on said screw pad for moving the screw pad, and thus the first grip member, toward the second grip member.

8. The grounding clip of claim 6, wherein the base section of each of said grip members has a recess formed along the length thereof adapted to align said grip members on either the base member and the crossmember of the frame, said first and second grip members being adapted to be interchangeable in position on the frame.

9. The grounding clip of claim 6, wherein the leg portions of the second grip member are adapted to slidably pass inside the two more widely spaced leg portions of the first grip member and outside the two less widely spaced leg portions thereof.

10. The grounding clip of claim 6, wherein a notched slot is defined in each of said grip members intermediate its ends.

* * * * *